(12) United States Patent
Subramanian et al.

(10) Patent No.: US 11,252,170 B2
(45) Date of Patent: Feb. 15, 2022

(54) SERVICE PLANE OPTIMIZATIONS WITH LEARNING-ENABLED FLOW IDENTIFICATION

(71) Applicant: Cisco Technology, Inc., San Jose, CA (US)

(72) Inventors: Ramanathan Subramanian, Milpitas, CA (US); Jeslin Antony Puthenparambil, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 246 days.

(21) Appl. No.: 16/534,987

(22) Filed: Aug. 7, 2019

(65) Prior Publication Data

US 2021/0044605 A1 Feb. 11, 2021

(51) Int. Cl.
H04L 29/06 (2006.01)
H04L 12/26 (2006.01)

(52) U.S. Cl.
CPC ........ *H04L 63/1425* (2013.01); *H04L 43/062* (2013.01)

(58) Field of Classification Search
CPC ........... H04L 29/12066; H04L 41/0213; H04L 41/5054; H04L 61/1511; H04L 63/0263; H04L 63/1458; H04L 63/0227; H04L 47/24; H04L 47/6275; H04L 69/22; H04L 63/1408; H04L 63/1425; H04L 12/2836; H04L 29/06068; H04L 29/06156; H04L 29/06476; H04L 29/08756; H04L 49/9089; H04L 63/1416; H04L 67/2823; H04L 69/08; H04L 69/169; H04L 63/145; H04L 67/2842; H04L 69/16; H04L 12/4641; H04L 41/06; H04L 47/22; H04L 47/6215; H04L 47/6225; H04L 47/625; H04L 47/6295; H04L 49/9005; H04L 63/0218; H04L 63/0245; H04L 63/0281; H04L 63/0471; H04L 63/08; H04L 63/1491; H04L 63/168; H04L 63/20; H04L 65/102; H04L 65/1033; H04L 65/4007; H04L 67/02; H04L 67/10; H04L 69/32; H04L 69/321; H04L 41/16; H04L 43/062;

(Continued)

(56) References Cited

U.S. PATENT DOCUMENTS 8,339,959 B1 12/2012 Moisand et al.
9,240,976 B1 * 1/2016 Murchison ............ H04L 63/145

(Continued)

*Primary Examiner* — Djenane M Bayard
(74) *Attorney, Agent, or Firm* — Polsinelli PC (57) ABSTRACT

The disclosed technology relates to a process for optimizing data flow within a computer network. The technology utilizes shared memory and machine learning logic to improve the efficiency of how computing resources are used during a transmission of data packets in the computer network. The shared memory is implemented during the transmission of data packets between the data plane and the service plane so that the copying of data packets after the data packets have been received and processed by an application is not necessary. The machine learning logic is implemented during the processing of the data packets in order to adjust a frequency or extent that the data packets (and corresponding source of the data packets) need to be evaluated to ensure that malicious content is not being transmitted across the computer network.

18 Claims, 7 Drawing Sheets

VPG – service engine facing internal i/f and Rx packet from SN
Tunnel – GRE decap
vPath – Handle TLVs
AppNav – Feature callback
DPSS – process metadata and restore packet states (58) Field of Classification Search
CPC . H04L 43/0876; H04L 45/20; H04L 47/2458; H04L 47/32; H04L 49/9063; H04L 43/18; H04L 43/026; H04L 43/028; H04L 43/045; H04L 2463/141; H04L 41/0896; H04L 43/0882; H04L 47/29; H04L 47/822; H04W 72/0446
See application file for complete search history.

(56) References Cited

U.S. PATENT DOCUMENTS

| | | |
|---|---|---|
| 9,246,825 B2 | 1/2016 | Jilani et al. |
| 9,652,612 B2 | 5/2017 | Brech et al. |
| 2010/0202466 A1* | 8/2010 | Eswaran ............. H04L 63/0263 370/400 |
| 2012/0227109 A1* | 9/2012 | Dimuro ............... H04L 63/1425 726/24 |
| 2015/0156122 A1 | 6/2015 | Singh et al. |
| 2016/0044054 A1* | 2/2016 | Stiansen ............. H04L 63/1416 726/24 |
| 2019/0141536 A1 | 5/2019 | Bachmutsky et al. |
| 2020/0366578 A1* | 11/2020 | Punj ....................... H04L 43/18 |

* cited by examiner

FIG. 1A

VPG – service engine facing internal i/f and Rx packet from SN
Tunnel – GRE decap
vPath – Handle TLVs
AppNav – Feature callback
DPSS – process metadata and restore packet states

SERVICE PLANE OPTIMIZATIONS WITH LEARNING-ENABLED FLOW IDENTIFICATION

TECHNICAL FIELD

The subject matter of this disclosure relates in general to computer networks, and more specifically for service plane optimizations with learning-enabled flow identification.

BACKGROUND

Edge computing is a distributed computing paradigm which brings computation and data storage closer to the location where it is needed. The purpose of providing the computation and data storage closer to the edge of the computing network is to improve response times and save bandwidth.

However, applications that are currently running as a container on different computing platforms make inefficient use of computing resources derived from the process of copying every data packet being transmitted within the computing network prior to and post reaching an application. This inefficient use of computing resources results in poor per packet latency. Therefore, there is a need for re-architecting the packet flow that can reduce the computing resources used in the transmission of data packets within the computing network and improve per packet latency.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

BRIEF DESCRIPTION OF EXAMPLE EMBODIMENTS

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

OVERVIEW

Disclosed herein are computer-implemented methods for optimizing data flow in a computer network. The optimization of the data flow in the computer network involves first storing identifying information about a data packet being transmitted in the computer network into shared memory. The shared memory is accessible only between a data plane of the computer network where the data packet originates and a service plane of the computer network associated with an application hosted on the computer network that is receiving the data packet. Next, an evaluation of the data packets is performed at the application which includes determining whether the data packet includes some malicious content. The application then generates a verdict based on the evaluation of the data packet. The verdict is used to instruct the computing network what to do next with the data packet (e.g., forward or drop). The data packet is then processed in accordance with the verdict. In particular, the data packet is processed via transmission of the verdict and the identifying information back to the data plane. The verdict is used to instruct how the data packet should be processed while the identifying information is matched with the stored identifying information to identify which of the data packets will be processed.

In another embodiment, the identifying information stored in the shared memory is stored in a ring buffer.

In another embodiment, the methods, computer-readable media, and systems for optimizing data flow in a computer network further includes a calculation of a confidence level using machine learning logic. The confidence level is calculated based on the evaluation of the data packet. The confidence level is then assigned to the source of the data packet to identify a level of trustworthiness of the source and its corresponding data packets.

In one embodiment, the confidence level defines a frequency of performing subsequent evaluations on other data packets associated with the source. In particular, the frequency identifies a period of time until a next evaluation. The frequency can also identify a number of data packets that can be transmitted without evaluations until the next evaluation needs to be performed.

In another embodiment, the confidence level defines an extent of evaluating other data packets associated with the source. In particular, the extent corresponds to a number of data packets that are evaluated during the next evaluation used to generate the verdict.

In addition, the disclosure also includes non-transitory computer-readable medium comprising instructions that optimize data flow in a computer network. The instructions, when executed by a computing system, causes the computer system to first store identifying information about a data packet being transmitted in the computer network into shared memory. The shared memory is accessible only between a data plane of the computer network where the data packet originates and a service plane of the computer network associated with an application hosted on the computer network that is receiving the data packet. Next, an evaluation of the data packets is performed at the application which includes determining whether the data packet includes some malicious content. The application then generates a verdict based on the evaluation of the data packet. The verdict is used to instruct the computing network what to do next with the data packet (e.g., forward or drop). The data packet is then processed in accordance with the verdict. In particular, the data packet is processed via transmission of the verdict and the identifying information back to the data plane. The verdict is used to instruct how the data packet should be processed while the identifying information is matched with the stored identifying information to identify which of the data packets will be processed.

The disclosure also includes systems that optimize data flow in a computing network. The system includes a processor and a -transitory computer-readable medium storing instructions that, when executed by the system, cause the system to store identifying information about a data packet being transmitted in the computer network into shared memory. The shared memory is accessible only between a data plane of the computer network where the data packet originates and a service plane of the computer network associated with an application hosted on the computer network that is receiving the data packet. Next, an evaluation of the data packets is performed at the application which includes determining whether the data packet includes some malicious content. The application then generates a verdict based on the evaluation of the data packet. The verdict is used to instruct the computing network what to do next with the data packet (e.g., forward or drop). The data packet is then processed in accordance with the verdict. In particular, the data packet is processed via transmission of the verdict and the identifying information back to the data plane. The verdict is used to instruct how the data packet should be processed while the identifying information is matched with the stored identifying information to identify which of the data packets will be processed.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As described herein, the present description provides details regarding how to optimize data flow within a computer network. In particular, the disclosed technology utilizes shared memory and machine learning logic to improve an efficiency of how computing resources are used during a transmission of data packets in the computer network. The shared memory is implemented during the transmission of data packets between the data plane and the service plane so that the copying of data packets after the data packets have been received and processed by an application is not necessary. The machine learning logic is implemented during the processing of the data packets in order to identify when or to what extent the data packets (and corresponding source of the data packets) need to be evaluated and authenticated/re-authenticated later on down the line to ensure that malicious content is not being transmitted across the computer network. By using the disclosed technology, a per-packet latency associated with the transmission of the data packets across the computer network can be minimized.

Figure 1A:
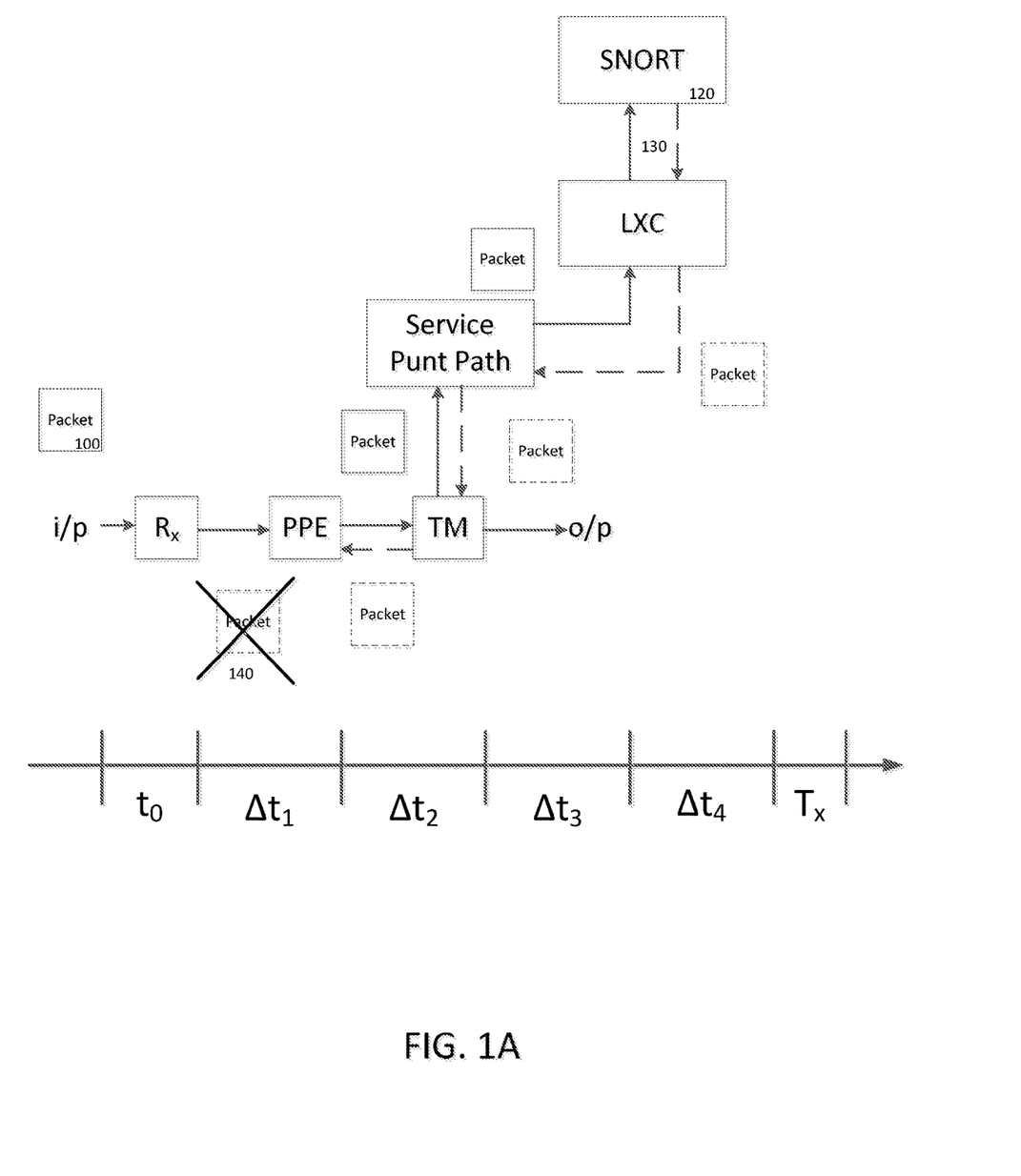
FIG. 1A and FIG. 1B illustrate an example packet flow for processing a data packet.
Figure 1B:
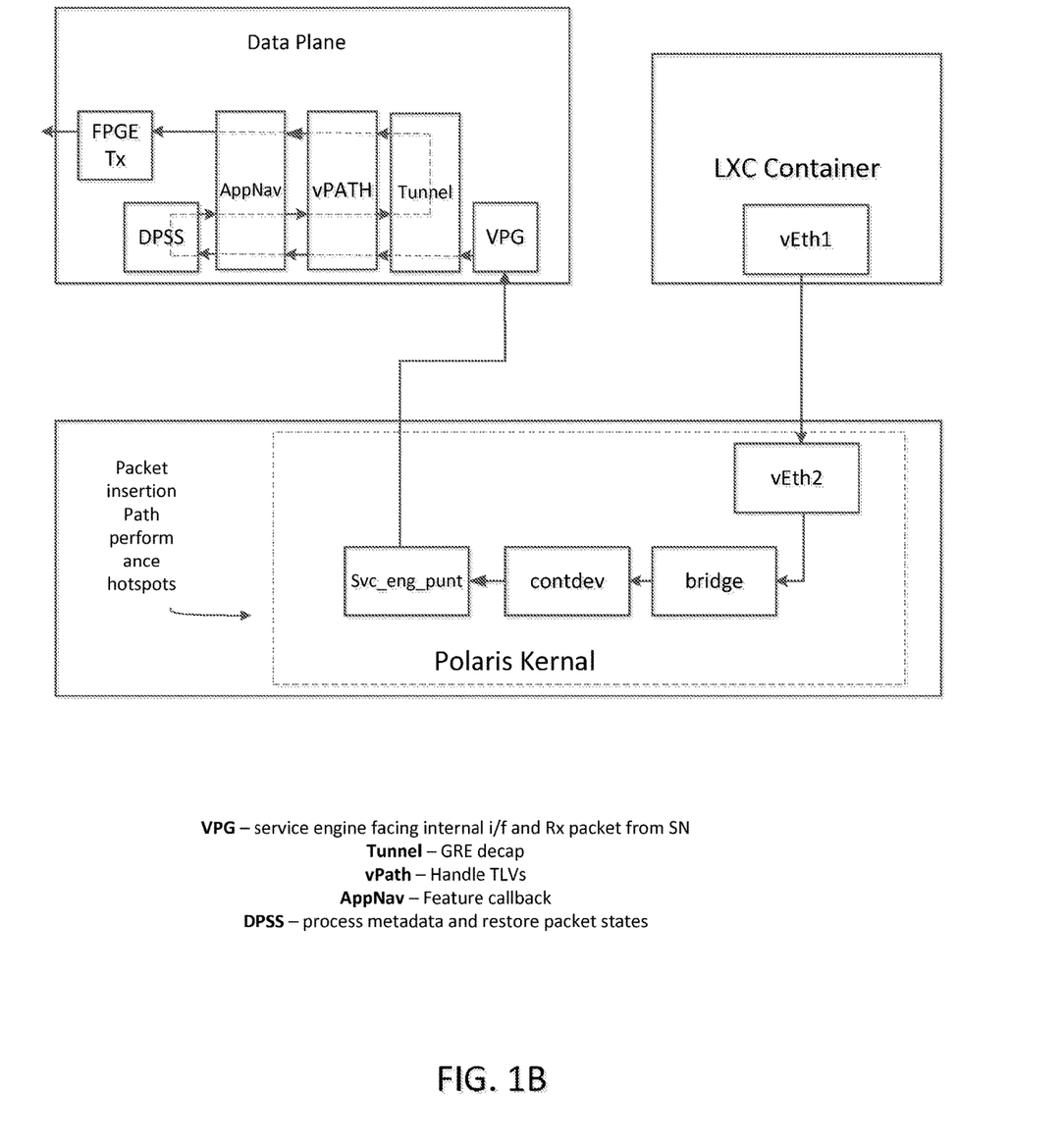

FIG. 1A and FIG. 1B illustrates an example packet flow for processing a data packet. In particular, FIG. 1A illustrates steps associated with the pre-processing and post-processing performed on the data packet in connection with an application hosted on a computer network. In an example illustrated in FIG. 1A, a data packet 100 can be transmitted to an application 120 (e.g., SNORT) hosted on the computer network in a Linux Container (LXC). The data packet 100 needs to undergo pre-preprocessing as the data packet is transmitted from a data plane (where the data packet originates) to a service plane (associated with the application). The pre-processing is represented via the solid line in FIG. 1A.

FIG. 1A provides SNORT as an exemplary application 120 although any other application can be used. The exemplary application 120 will evaluate the data packet 100 to make a determination regarding whether to forward or drop the data packet 130. The evaluation performed on the data packet includes, for example, checking the IP header fields and payload and comparing it against various downloaded signatures to determine the authenticity or presence of possible malicious content included therein.

Once a verdict has been provided by the application, post-processing of the data packet involves transmitting the data packet and the verdict back to the Packet Processing Engine (PPE) to inform the next steps that will be performed with the data packet: whether to forward the data packet to its next destination or to drop the data packet. This is represented via the dashed line in FIG. 1A.

The post-processing steps that are involved with executing what needs to be done with the data packet includes transmitting a copy of the data packet and the determined verdict back to the PPE. The copy of the data packet was provided in order to associate the verdict with the corresponding data that will be forwarded or dropped. The copy of the data packet is created even if the data packet is determined by the application that the data packet should be dropped 140.

FIG. 1B provides further details regarding the individual steps involved in the pre-processing and post-processing of the data packet as illustrated in FIG. 1A. The post-processing involved with transmitting the copy of the data packet with the verdict back to the PPE involves significant time and computing resources needed as the data packet retraces its route back from the application to the PPE. During the re-tracing, the data packet will need to be further processed in order to be compatible with each of the elements on its route way back to the PPE.

The post-processing of each data packet being processed by the application (in connection with both FIG. 1A and FIG. 1B above) translates to a significant amount of latency as time and computing resources are needed to perform the copying of the data packet and processing of the data packet as the data packet is routed back through the computer network to the PPE. Based on the size and number of different data packets being transmitted within the computer network, the time and resources needed translates to an increased in per packet latency and reduced throughput that can be avoided—especially in situations where the verdict involves informing the PPE to drop the data packet.

Figure 2:
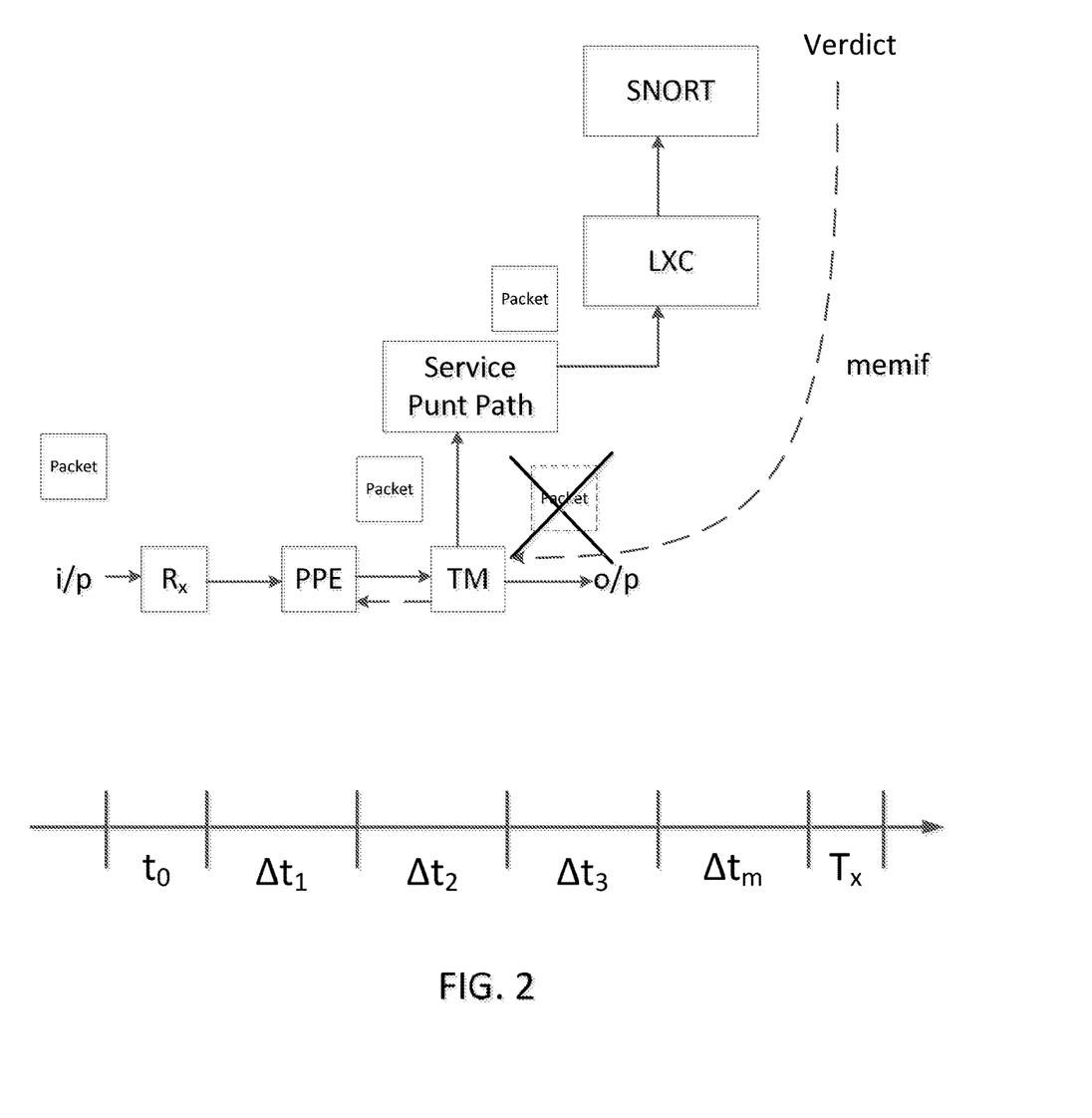
FIG. 2 illustrates another example packet flow for processing the data packet in accordance with various embodiments of the subject technology.

FIG. 2 illustrates another example packet flow for processing the data packet in accordance with various embodiments of the subject technology. The illustrated packet flow illustrates an improved process whereby the data packet is no longer copied for purposes of the post-processing associated with the verdict (as described above in FIG. 1A and FIG. 1B). Rather, a shared memory is implemented in connection with transmission of the data packet within the computer network in each direction (e.g., pre- and post-processing in connection with the application). The memory is shared between only the data plane (e.g., where the data packets originate) and the service plane (e.g., the hosted application) for the purposes of optimizing the data packet flow by minimizing the amount of information that needs to be sent back to the PPE.

The shared memory saves metadata associated with each data packet being transmitted within the computer network so that copies do not need to be created when the verdict is being provided back to the PPE. When the data packet is being transmitted from the data plane to the service plane, the metadata is generated that is then stored in the shared memory identifying the existence of the data packet. When the verdict is determined by the application, the metadata can then be associated with the verdict and sent to the PPE alongside the verdict so that a copy of the data packet needs not be generated. The verdict is associated with the metadata (e.g., identifier) that is used to link the verdict with its corresponding data packet. In an embodiment, the metadata used to link the verdict with its corresponding data packet can be stored in a ring buffer—the ring buffer being associated with the shared memory. In this way, the PPE can look for and identify which data packet needs to be forwarded or dropped based on the received verdict without needing the data packet to be copied and sent along with the verdict.

The disclosed technology provides improvements to the per packet latency and throughput of the computer network based on the reduction/elimination of the duplication of the data packets. As provided below in Table 1, a comparison between the data flows as illustrated in FIG. 1A and FIG. 1B with the data flow as illustrated in FIG. 2 is shown. In each case, the throughput of the computer network is improved when the data flow of FIG. 2 is used. Different levels of improvement are shown based on the packet size. In particular, with the smaller data packet sizes, there are more opportunities that the disclosed technology can be used to remove the duplication of the data packets thereby optimizing the time and resources associated with the processing of the data packets.

involved generating copies of the data packet (as illustrated in FIG. 1A and FIG. 1B), time and resources can also be optimized using the disclosed technology pertaining to when to evaluate the authenticity of the data packets and/or the source of the data packets (e.g., data content stream). On one hand, evaluation of each and every data packet can be performed to ensure that no malicious content will be transmitted and used by the application within the computer network. However, evaluating each and every data packet in this manner will utilize significant amounts of time and computing resources that would in turn impact the per packet latency and throughput of the computer network. On the other hand, not evaluating enough of the data packets raises a possibility that identification of the malicious content will be missed thereby raising the possibility that malicious content may be transmitted and used by the application (and other applications that receive the forwarded malicious content) within the computer network. Furthermore, it would not be enough to merely evaluate the first data packet within a data content stream and evaluate all subsequent data packets from the same data content stream because there may be scenarios where malicious content can be introduced within the data content stream after the evaluation has been performed.

To provide a balance between these two extremes and to minimize the possibility that malicious content is introduced in subsequent data packet transmissions, machine learning logic is utilized in connection with the processing of the data packets in order to identify when the data packets and/or the source of the data packets (e.g., data content stream) should be evaluated. In particular, a confidence threshold is established for data packets and their respective sources (e.g., data content stream) that corresponds to how frequently data packets within a data content stream is evaluated.

The confidence threshold may be customized to evaluate a pre-determined number of data packets of a data content stream before a determination regarding whether the data packets contain malicious content or contain appropriate data content. Based on the outcome determination, the machine learning logic can assign a confidence level for the data content stream. The assigned confidence level indicates a degree of certainty that the data packet and subsequent data packets do not include malicious content.

TABLE 1

Test Results on Curie Platform

| Simple loopback on Contdev | Loopback with memif |
|---|---|
| Packet size 362 | Packet size 362 |
| PPS: 130,000, BPS: 376M | PPS: 320,000, BPS: 926M |
| Usage: PP 22%, RX 57%, TM 42% | Usage: PP 48%, RX 23%, TM 32% |
|  | test program: 8.3% |
| Packet size 100 | Packet size 100 |
| PPS: 145,000, BPS: 114m | PPS: 831,000, BPS: 664M |
| Usage: pp 21% RX 55% TM 44% | Usage: PP 97% RX 41% TM 58% |
|  | test program 18.7% |
| Packet size 1000 | Packet size 1000 |
| PPS: 121,000 BPS: 968M | PPS: 121,600 BPS: 973M |
| Usage: PP 21% RX 52% TM 40% | Usage: PP 24.8% RX 15% TM 19% |
|  | test program 4.3% |
| PP: 3 Cores, Rx + TM: 1 Core | |
| Removing Punt policer (Current value is 150,000) | |
| vpg is limited to 1G (after removing a 750M limit) | |

In addition to the time and computing resources that the computer network required to process the data packet which After an initial evaluation of a data packet for malicious content, an initial confidence level can be assigned that identifies, for example, a frequency that data packets associated with that same data content stream will be evaluated in the future for malicious content. At a later period in time (e.g. after a pre-determined period of time, after a pre-determined number of data packets), another data packet from the same data content stream can be evaluated to detect whether malicious content is being transmitted.

Based on the outcome of the later evaluation, the machine learning logic can then modify the initially assigned confidence level for the data content stream. For example, based on one or more subsequent evaluations that determine that the data packets associated with the data content stream do not contain malicious content, the modified confidence level can then reflect a confidence level that, for example, decreases the frequency in between subsequent evaluations for malicious content. Because subsequent evaluations of the same content stream did not detect malicious content, this can be used as an indication that the data content stream may be trusted thereby justifying less oversight over the data packets being transmitted.

However, if a later evaluation of a data packet of the data content stream detects malicious content, the modified confidence level can then reflect a confidence level that, for example, increases the frequency in between subsequent evaluations for malicious content. Because subsequent evaluations of the same content stream detected malicious content, this can be used as an indication that the data content stream may not be trust-worthy. The modified confidence level may then justify an increased amount of oversight of the data packets coming from the data content stream in order to prevent malicious content from being transmitted.

The modifications made to the initially assigned confidence level provides possible scenarios where time and computing resources can be optimized based on the determination by the machine learning logic of whether a data content stream is trust worthy or not (as it pertains to transmitting malicious content) based on the assigned confidence levels. Because a high confidence level (corresponding to an extended period of time where no malicious content has been detected within the data content stream) can be used to presume that the data packets being transmitted do not contain malicious content, less time and computing resources may be used to evaluate data packets associated with that data content stream. The time and computing resources saved by not having to evaluate the trusted data content streams (based on having high confidence levels) may be redistributed to evaluate data content streams that do not have high confidence levels. In some scenarios, if the data content streams all have high confidence levels, the time and computing resources saved relating to not having to evaluate each of the data packets for malicious content can improve the per-packet latency and throughput of the computer network.

Figure 3:
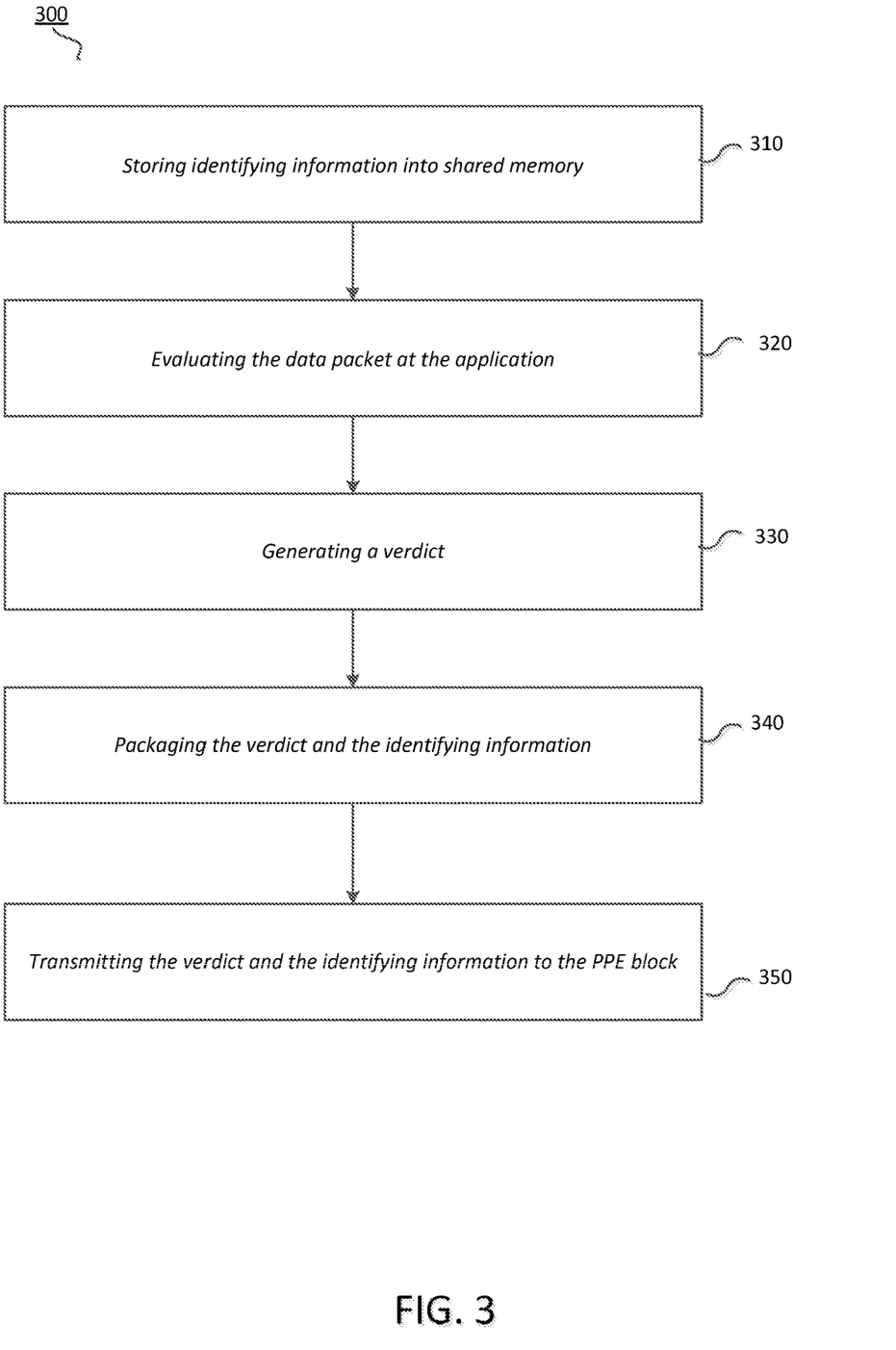
FIG. 3 illustrates an example method of processing the data packet in accordance with various embodiments of the subject technology.

FIG. 3 illustrates an example method 300 of processing the data packet in accordance with various embodiments of the subject technology. The processing of the data packets will use shared memory to store identifying information e.g. metadata) about data packets so that at a later time, only the verdict (along with the identifying information) would need to be transmitted to the PPE. The use of the shared memory removes the need to make a duplicate copy of the data packet to be transmitted back with the verdict thereby saving time and computing resources in the computer network.

In step 310, identifying information (e.g. metadata) is stored for data packets in shared memory. The shared memory is only accessible between a data plane (which originates the data packets) and a service plane (associated with an application the data packets are being transmitted to). The identifying information for the data packets may be stored by the data plane, for example, in a ring buffer so that identification of the data packet associated with the identifying information will be possible when the identifying information is provided with the verdict (in step 340).

In step 320, the data packet is provided to the application. The application may be an application hosted on a container within a computer network. The data packet is evaluated by the application in order to determine what to do with the data packet. For example, the application may determine that the data packet should be used and thus forwarded to another destination (e.g. another application on the computer network). The application may also determine that the data packet should be dropped, for example, if malicious content has been detected.

Based on the evaluation, the application generates a verdict associated with the data packet. The verdict that is generated by the application will instruct the PPE what to do with the data packet. With respect to the examples provided above in step 320, exemplary verdicts may include the decision to forward the data packet or to drop the data packet. Other verdicts may also be considered and implemented.

Once the verdict has been generated, the verdict and the identifying information of the corresponding data packet that was evaluated (in step 320) will be packaged/formatted so that the combination of both the verdict and the identifying information can be transmitted. Because the identifying information is being associated with the verdict, there is no longer a need to duplicate the data packet and send the copied data packet with the verdict thereby saving time and computing resources. Rather, the identifying information can be used to identify the specific data packet that the verdict pertains to by searching and matching the identifying information with the information stored in the shared memory. In this way, the determination of what should be done to the data packet based on the verdict can be carried out without the need to duplicate and send the data packet with the verdict.

In step 350, the verdict and identifying information is transmitted back to the PPE. The PPE, upon receipt of the verdict and identifying information, is able to identify the specific data packet using the identifying information by referring to the information stored in the shared memory (in step 310). In this way, the PPE is able to perform the subsequent action (e.g. forward or drop) to the correct data packet without needing a duplicate copy of the data packet to be sent with the verdict.

Figure 4:
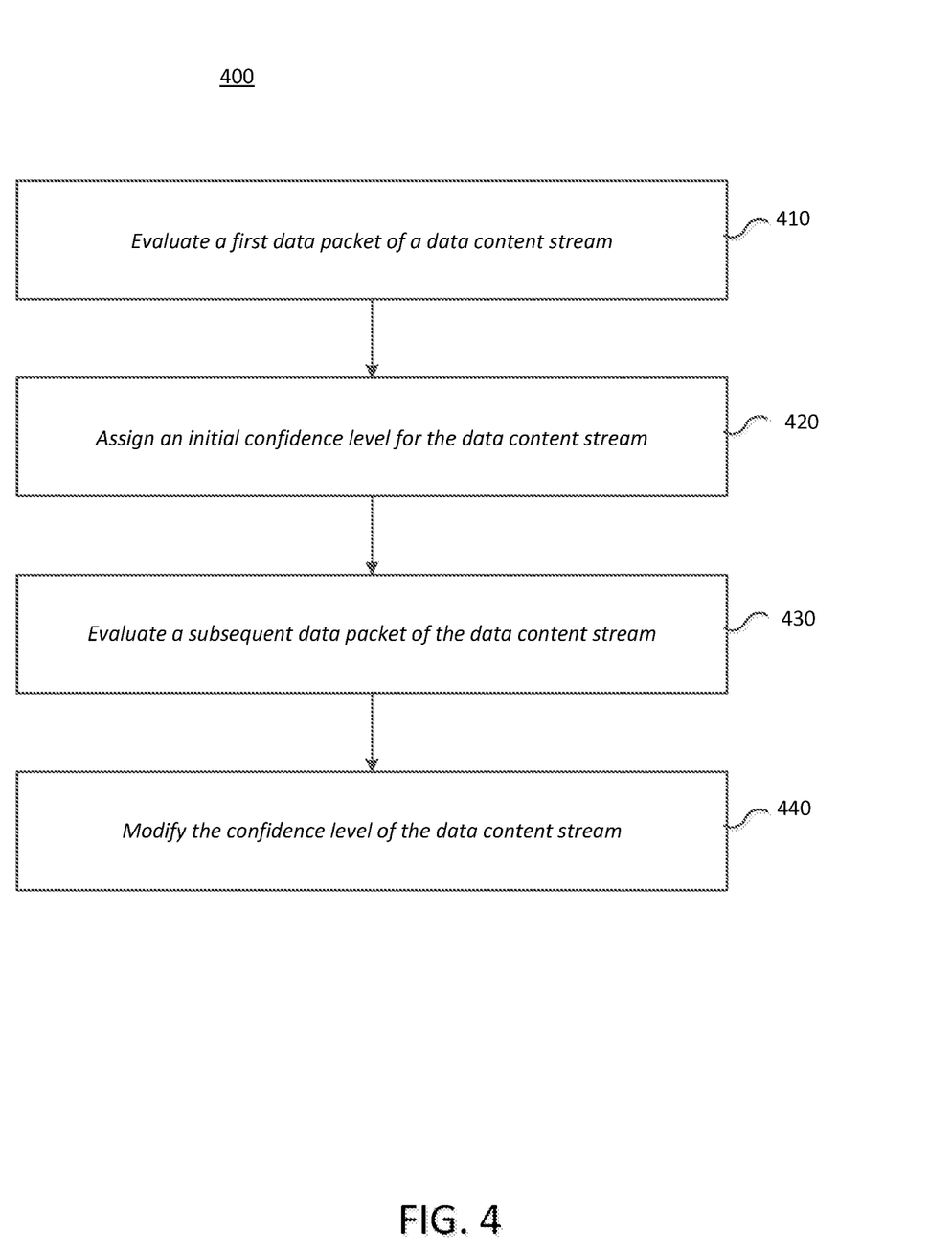
FIG. 4 illustrates an example method of authenticating the data packet using machine learning logic during the processing of the data packet.

FIG. 4 illustrates an example method 400 for evaluating data packets and using machine learning logic to assign a confidence level for the corresponding data content stream. The confidence level corresponds to a frequency that data packets for a content data stream may be evaluated to detect whether malicious content is being transmitted. Based on the confidence level assigned to the data content stream by the machine learning logic, evaluation of subsequent data packets for that same data content stream can be tailored to optimize the time and computing resources needed to detect whether future data packets may potentially have malicious content.

Upon receiving a data packet at the application, in step 410, the application may evaluate the legitimacy of the contents of the data packet. In particular, the application may perform various processes in order to identify whether malicious content is contained within the data packet being transmitted to the application.

Based on the evaluation of the data packet, the computer network assigns in step 420 the source of the data packet (e.g. data content stream) a confidence level that indicates a level a trust that the data packets sent by the source either provides legitimate content (e.g. high confidence level) or contains malicious content (e.g. low confidence level). The assigning of the confidence level can be implemented using machine learning logic that takes into account a variety of different factors and calculates a corresponding confidence level.

In an example embodiment, the confidence level can be calculated as follows using machine learning. The data packet contents and data content stream identification can be transformed into a feature vector to represent the data packet contents and the data content stream. Each of the feature vectors for the data packets and the data content streams can then be labeled with their corresponding verdict provided from the application. The combination of the feature vectors and the labels will be used as a data set from which a machine learning model (e.g., probabilistic model) is generated and trained. The training performed on the machine learned model aims to maximize the detection of malicious content based on the predicted confidence level.

When the machine learned models are used within a production environment (e.g., during a testing phase), the machine learned model can be used to provide updates to the confidence level of the data content stream. A low confidence level can initially be assigned to each data content stream. However, with an increasing number of data packets inspected for individual data content streams, the machine learning model is used to update the confidence levels accordingly.

In some embodiments, the machine learning process may not be persistent. For example, when an application is restarted (say as a result of a restart of the overall system), all the learned parameters (e.g. confidence threshold) about the data content stream may be reset. However, in other embodiments, the learned parameters may be stored in memory and retrieved after a restart so that the learned parameters are not lost and the machine learning process can resume from where it last left off.

The confidence level can be used by the computer network in order to identify at what frequency data packets associated with that source (e.g. data content stream) should be evaluated. For example, a data content stream with a high confidence level may be deemed as being trustworthy and thus would only be evaluated for malicious content at a less frequent basis compared to a different data content stream with a low confidence level. The data content stream with the low confidence level may be deemed as being less trustworthy and more likely to transmit malicious content. Therefore, the data content streams with low confidence levels may need to be evaluated on a more frequent basis.

In another embodiment, the confidence level can be used to identify the scope/extent evaluations are performed on the data content streams. For example, based on the confidence level, a pre-determined number of data packets may be evaluated from the same data content stream before a determination of whether malicious content is detected can be made. A higher confidence level may require less data packets (e.g. samples) while a lower confidence level may require more data packets to make the determination whether malicious content is detected.

The use of confidence levels (as assigned by the machine learning logic) to optimize the processing of the data packets of the data content stream provides benefits of saving time and computing resources with respect to those data content streams that are more trustworthy. Time and computing resources would be wasted on evaluating each and every data packet coming from sources that are determined to (and trusted) not to send malicious content. The time and computing resources that no longer need to be used to evaluate the data content streams that have high confidence levels can be saved by having some number of subsequent data packets passed through without further evaluation. The savings in the time and computing resources can provide an improvement in per packet latency and throughput within the computer network. In other embodiments, the time and computing resources can also be re-allocated to perform evaluations for those data content streams that have lower confidence levels and therefore necessitate more frequent evaluations to prevent malicious content from being used and transmitted within the computer network.

Even though an initial evaluation of data packets with a data content stream may provide a confidence level, there is a need to perform subsequent evaluations in order to maintain the legitimacy/trustworthiness of the data content streams. For example, it may be possible that a data content stream can provide legitimate data packets for a first period of time but later (after a confidence level has been assigned in step 420) begin providing data packets that include malicious content. Therefore, subsequent evaluation of data packets within the data content stream will be performed in step 430.

The assigned confidence level (in step 420) may be used to identify when the subsequent evaluation in step 430 should take place. For example, a high confidence level may indicate that the subsequent evaluation should be performed after a pre-determined period of time or after a pre-determined number of data packets have been processed by the application. A low confidence level may indicate that the subsequent evaluation should be performed sooner than compared to a data content stream having a higher confidence level.

Based on the subsequent evaluation in step 430, the machine learning logic can then modify the confidence level for the source of the evaluated data packet accordingly (e.g., increase the confidence level if no malicious content was detected). The modified confidence level can then in turn inform the computing network when the next evaluation should be performed.

The recursive/iterative nature of the evaluation of data packets and assigned confidence levels for different data content streams can be used by the machine learning logic to optimize how time and computing resources in detecting malicious content. As a data content stream is continually validated when the evaluated data packets of the data content stream are determined not to contain malicious content, the frequency for evaluating the data packets for that data content stream can be less frequent or less extensive.

Figure 5:
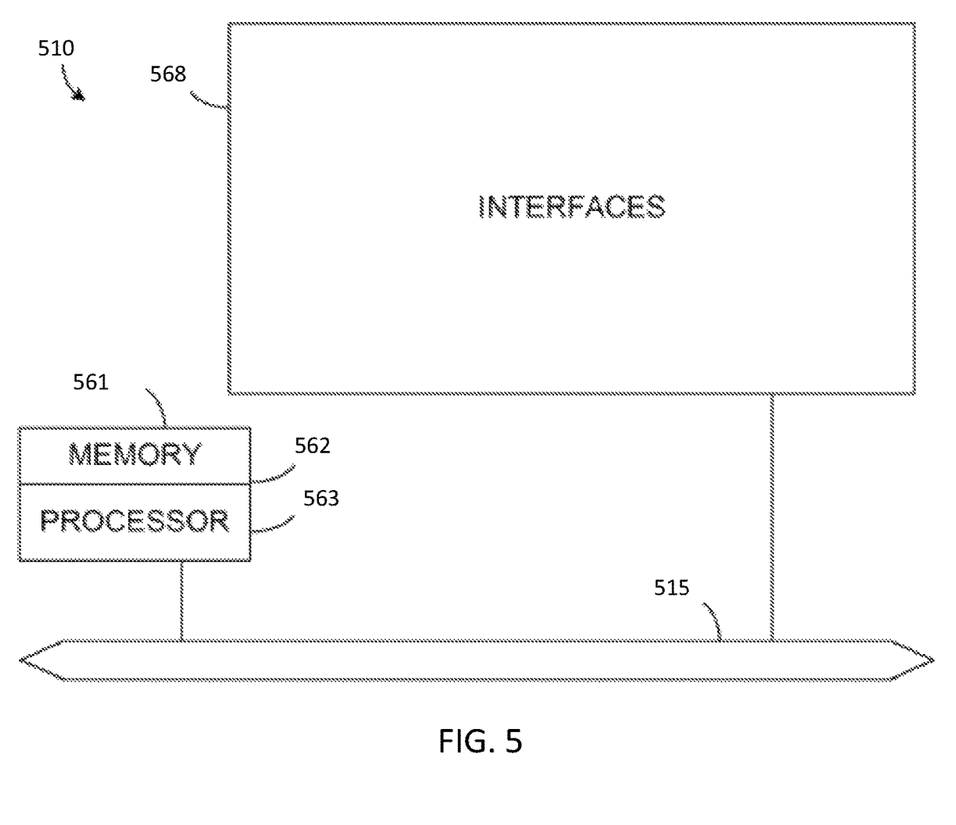
FIG. 5 illustrates an example network device suitable for implementing the various embodiments of the subject technology.

FIG. 5 illustrates an example network device 510 suitable for implementing the various embodiments of the subject technology. Network device 510 includes a master central processing unit (CPU) 562, interfaces 568, and a bus 515 (e.g., a PCI bus). When acting under the control of appropriate software or firmware, the CPU 562 is responsible for performing the steps associated with processing and authenticating the data packet as illustrated in FIG. 3 and FIG. 4, respectively. The CPU 562 preferably accomplishes all these functions under the control of software including an operating system and any appropriate applications software.

CPU 562 may include one or more processors 563 such as a processor from the Motorola family of microprocessors or the MIPS family of microprocessors. Other processors may also include Intel/AMD x86 processors, ARM based processors, Power PC processors, and RISCV processors from various different vendors. In an alternative embodiment, processor 563 is specially designed hardware for controlling the operations of the network device 510. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the router 510. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the computation intensive tasks, these interfaces allow the master microprocessor 562 to efficiently perform routing computations, network diagnostics, security functions, etc.

Although the system shown in FIG. 5 is one specific network device of the present embodiments, it is by no means the only network device architecture on which the present embodiments can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6:
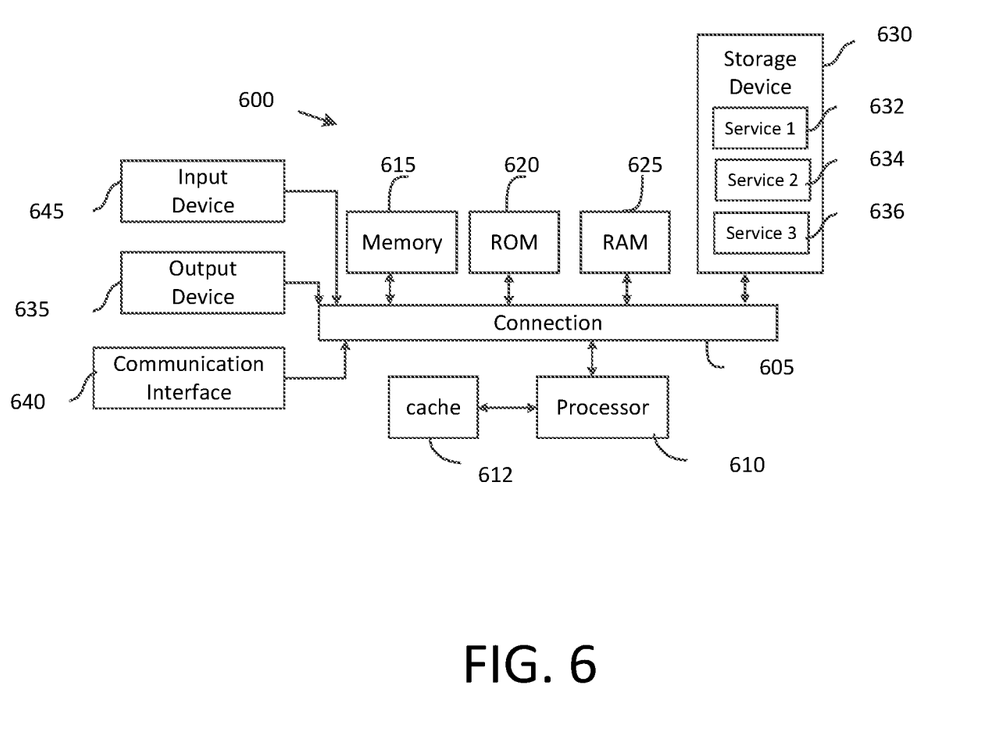
FIG. 6 illustrates an example computing system in accordance with various embodiments of the subject technology.

FIG. 6 illustrates an example computing system 600, which can be for example any computing device used during the processing of the data packet as described above or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for optimizing data flow in a computer network, the method comprising:
storing identifying information about a data packet being transmitted in the computer network into shared memory to yield stored identifying information, wherein the shared memory is accessible only between a data plane of the computer network where the data packet originates and a service plane of the computer network associated with an application hosted on the computer network that is receiving the data packet;
evaluating the data packet at the application, wherein the evaluation performed at the application comprises determining whether the data packet includes malicious content;
generating a verdict based on the evaluation of the data packet, wherein the verdict instructs the computer network whether the data packet is to be forwarded or dropped; and
processing the data packet using the verdict and the identifying information about the data packet, wherein the processing includes transmitting the verdict and the identifying information back to the data plane to yield data plane identifying information, wherein the processing of the data packet uses the verdict to instruct how the data packet should be processed and, wherein the data plane identifying information is matched with the stored identifying information in the shared memory to identify the data packet that will be processed in accordance to the verdict.

2. The method of claim 1, wherein the identifying information is stored in a ring buffer associated with the shared memory.

3. The method of claim 1, further comprising:
calculating a confidence level using machine learning logic, wherein the confidence level is calculated based on the evaluating of the data packet; and
assigning a source of the data packets with the confidence level, wherein the confidence level identifies a level of trustworthiness of the source and its corresponding data packets.

4. The method of claim 3, wherein the confidence level defines a frequency of performing subsequent evaluations on other data packets associated with the source, wherein the frequency identifies a period of time until a next evaluation.

5. The method of claim 4, wherein the frequency also identifies a number of data packets that are transmitted without evaluations until the next evaluation.

6. The method of claim 3, wherein the confidence level defines an extent of evaluating other data packets associated with the source, wherein the extent identifies a number of data packets that are evaluated during the next evaluation.

7. A non-transitory computer-readable medium comprising instructions that optimize data flow in a computer network, the instructions, when executed by a computing system, cause the computing system to:
store identifying information about a data packet being transmitted in the computer network into shared memory to yield stored identifying information, wherein the shared memory is accessible only between a data plane of the computer network where the data packet originates and a service plane of the computer network associated with an application hosted on the computer network that is receiving the data packet;
evaluate the data packet at the application, wherein the evaluation performed at the application comprises determining whether the data packet includes malicious content;
generate a verdict based on the evaluation of the data packet, wherein the verdict instructs the computer network whether the data packet is to be forwarded or dropped; and
process the data packet using the verdict and the identifying information about the data packet, wherein the processing includes transmitting the verdict and the identifying information back to the data plane to yield data plane identifying information, wherein the processing of the data packet uses the verdict to instruct how the data packet should be processed and, wherein the data plane identifying information is matched with the stored identifying information in the shared memory to identify the data packet that will be processed in accordance to the verdict.

8. The non-transitory computer-readable medium of claim 7, wherein the instructions causes the computing system to store the identifying information in a ring buffer associated with the shared memory.

9. The non-transitory computer-readable medium of claim 7, wherein the instruction further cause the computing system to:
  calculate a confidence level using machine learning logic, wherein the confidence level is calculated based on the evaluating of the data packet; and
  assign a source of the data packets with the confidence level, wherein the confidence level identifies a level of trustworthiness of the source and its corresponding data packets.

10. The non-transitory computer-readable medium of claim 9, wherein the confidence level defines a frequency of performing subsequent evaluations on other data packets associated with the source, wherein the frequency identifies a period of time until a next evaluation.

11. The non-transitory computer-readable medium of claim 10, wherein the frequency also identifies a number of data packets that are transmitted without evaluations until the next evaluation.

12. The non-transitory computer-readable medium of claim 9, wherein the confidence level defines an extent of evaluating other data packets associated with the source, wherein the extent identifies a number of data packets that are evaluated during the next evaluation.

13. A system optimizing data flow in a computer network, the system comprising:
  a processor; and
  a non-transitory computer-readable medium storing instructions that, when executed by the system, cause the system to:
    store identifying information about a data packet being transmitted in the computer network into shared memory to yield stored identifying information, wherein the shared memory is accessible only between a data plane of the computer network where the data packet originates and a service plane of the computer network associated with an application hosted on the computer network that is receiving the data packet,
    evaluate the data packet at the application, wherein the evaluation performed at the application comprises determining whether the data packet includes malicious content,
    generate a verdict based on the evaluation of the data packet, wherein the verdict instructs the computer network whether the data packet is to be forwarded or dropped, and
    process the data packet using the verdict and the identifying information about the data packet, wherein the processing includes transmitting the verdict and the identifying information back to the data plane to yield data plane identifying information, wherein the processing of the data packet uses the verdict to instruct how the data packet should be processed and, wherein the data plane identifying information is matched with the stored identifying information in the shared memory to identify the data packet that will be processed in accordance to the verdict.

14. The system of claim 13, wherein the instructions causes the system to store the identifying information in a ring buffer associated with the shared memory.

15. The system of claim 13, wherein the instruction further cause the system to:
  calculate a confidence level using machine learning logic, wherein the confidence level is calculated based on the evaluating of the data packet; and
  assign a source of the data packets with the confidence level, wherein the confidence level identifies a level of trustworthiness of the source and its corresponding data packets.

16. The system of claim 15, wherein the confidence level defines a frequency of performing subsequent evaluations on other data packets associated with the source, wherein the frequency identifies a period of time until a next evaluation.

17. The system of claim 16, wherein the frequency also identifies a number of data packets that are transmitted without evaluations until the next evaluation.

18. The system of claim 15, wherein the confidence level defines an extent of evaluating other data packets associated with the source, wherein the extent identifies a number of data packets that are evaluated during the next evaluation.

* * * * *